US012719689B2

(12) United States Patent
Cárdenes Cabré et al.

(10) Patent No.: US 12,719,689 B2
(45) Date of Patent: Aug. 25, 2026

(54) SECURE ENROLLMENT OF PASSKEYS WITH VERIFIABLE CREDENTIALS

(71) Applicant: Via Science, Inc., Somerville, MA (US)

(72) Inventors: Jesús Alejandro Cárdenes Cabré, Montreal (CA); Madjid Aoudia, Rennes (FR)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 19/352,600

(22) Filed: Oct. 8, 2025

(65) Prior Publication Data

US 2026/0100841 A1 Apr. 9, 2026

Related U.S. Application Data

(60) Provisional application No. 63/705,357, filed on Oct. 9, 2024.

(51) Int. Cl.
*H04L 9/32* (2006.01)
*H04L 9/40* (2022.01)

(52) U.S. Cl.
CPC .......... *H04L 9/3226* (2013.01); *H04L 9/3213* (2013.01); *H04L 9/3271* (2013.01); *H04L 63/0807* (2013.01)

(58) Field of Classification Search
CPC ... H04L 9/3226; H04L 9/3213; H04L 9/3271; H04L 63/0807
See application file for complete search history.

(56) References Cited

U.S. PATENT DOCUMENTS

2014/0351589 A1* 11/2014 Chenna ............... H04W 12/068 713/168
2019/0319939 A1* 10/2019 Hamel .................... G06F 21/33
2020/0413260 A1* 12/2020 Mendez .................. G06F 21/32
2021/0194703 A1* 6/2021 Queralt ............... H04L 63/0815
2023/0020656 A1* 1/2023 Momchilov ........ H04L 63/0807
2023/0350988 A1 11/2023 Bae et al.
2024/0073024 A1 2/2024 Bertocci et al.

(Continued)

OTHER PUBLICATIONS

Notification of Transmittal of the International Search Report and the Written Opinion of the International Searching Authority, for International Patent Application No. PCT/US2025/049781, mailed on Dec. 16, 2025, 16 pages.

*Primary Examiner* — David J Pearson
(74) *Attorney, Agent, or Firm* — Pierce Atwood LLP

(57) ABSTRACT

A system may be configured for a streamlined and secure process for enrolling passkeys that reduces exposure of the user's credentials, simplifies passkey registration and cancellation, and enables isolated user management with tokenized authorization. A user device may have a digital wallet capable of securely storing credentials and generating a verifiable presentation (VP) of possession of the credentials. When a user of the device attempts to access a resource associated with a relying party, the relying party may forward the request to a verifier system, which may present the device with a quick-response code or other data conveying a specification for the VP. Subject to user approval, the digital wallet may generate the VP and return it to the verifier system. Upon verification of the VP, the relying party may generate an authentication token, which the user may use for continued access to the resource while the token remains valid.

15 Claims, 9 Drawing Sheets

(56) References Cited

U.S. PATENT DOCUMENTS

| | | | | |
|---|---|---|---|---|
| 2024/0283657 | A1* | 8/2024 | Jose | H04L 9/3297 |
| 2024/0283664 | A1* | 8/2024 | Islam | H04L 9/3271 |
| 2025/0071228 | A1* | 2/2025 | Hosoda | H04N 1/444 |
| 2025/0080350 | A1* | 3/2025 | Maddukuri | H04L 9/3213 |
| 2025/0125965 | A1* | 4/2025 | Galal | H04L 9/3226 |
| 2025/0294017 | A1* | 9/2025 | Barbir | H04L 63/0815 |

* cited by examiner

Trusted Issuer System(s) 130
Resource System(s) 150
Relying party System(s) 120
Trusted Verifier System(s) 140
Token(s) 125
Network(s) 199
Client 114
Wallet 112
Passkey(s) 115
VC(s) 135
User Device 110a
User Device 110b
User 5

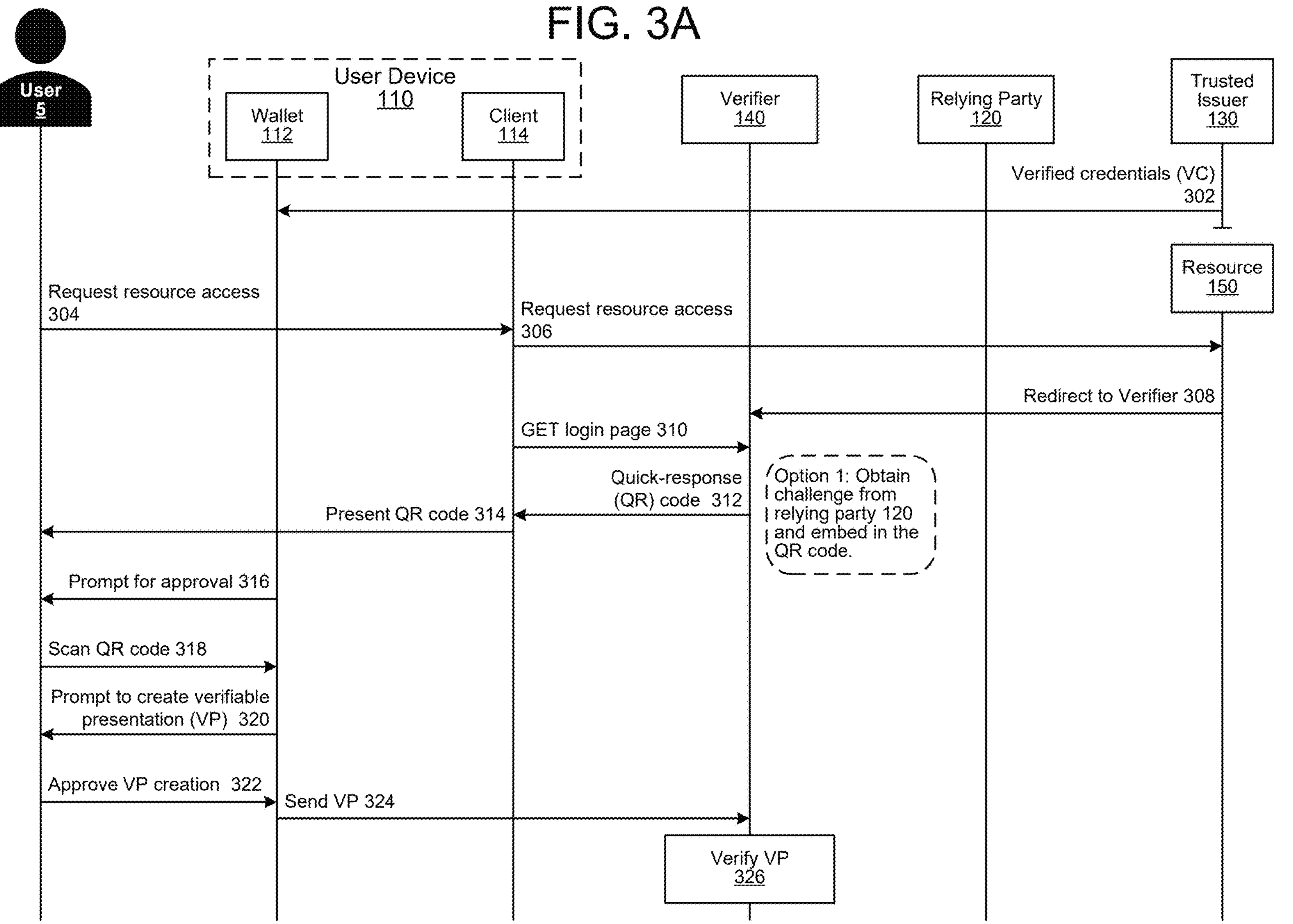
FIG. 3A
User 5
User Device 110
Wallet 112
Client 114
Verifier 140
Relying Party 120
Trusted Issuer 130
Verified credentials (VC) 302
Resource 150
Request resource access 304
Request resource access 306
Redirect to Verifier 308
GET login page 310
Quick-response (QR) code 312
Option 1: Obtain challenge from relying party 120 and embed in the QR code.
Present QR code 314
Prompt for approval 316
Scan QR code 318
Prompt to create verifiable presentation (VP) 320
Approve VP creation 322
Send VP 324
Verify VP 326

FIG. 3B

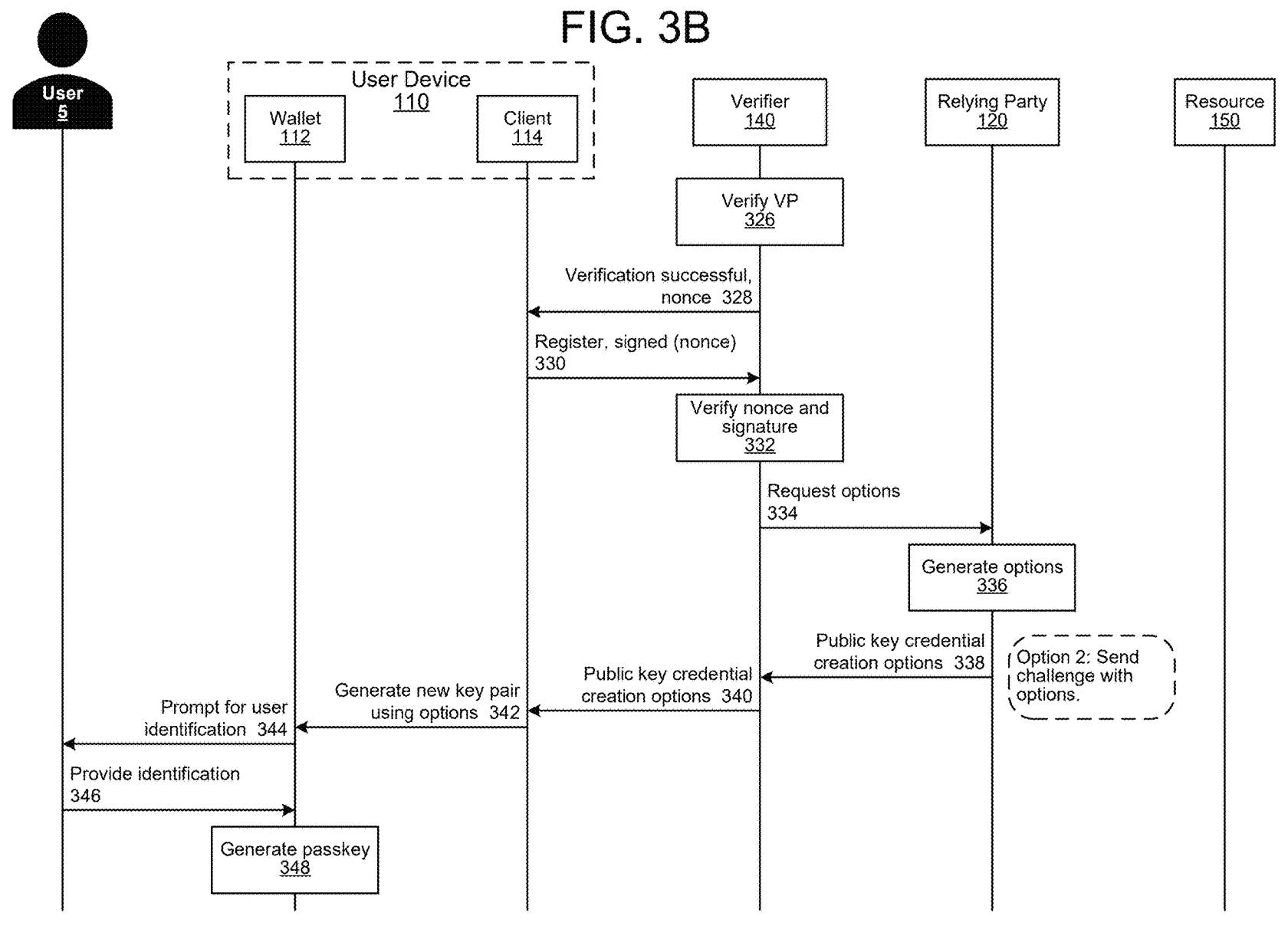

User 5

User Device 110

Wallet 112

Client 114

Verifier 140

Relying Party 120

Resource 150

Verify VP 326

Verification successful, nonce 328

Register, signed (nonce) 330

Verify nonce and signature 332

Request options 334

Generate options 336

Option 2: Send challenge with options.

Public key credential creation options 338

Public key credential creation options 340

Generate new key pair using options 342

Prompt for user identification 344

Provide identification 346

Generate passkey 348

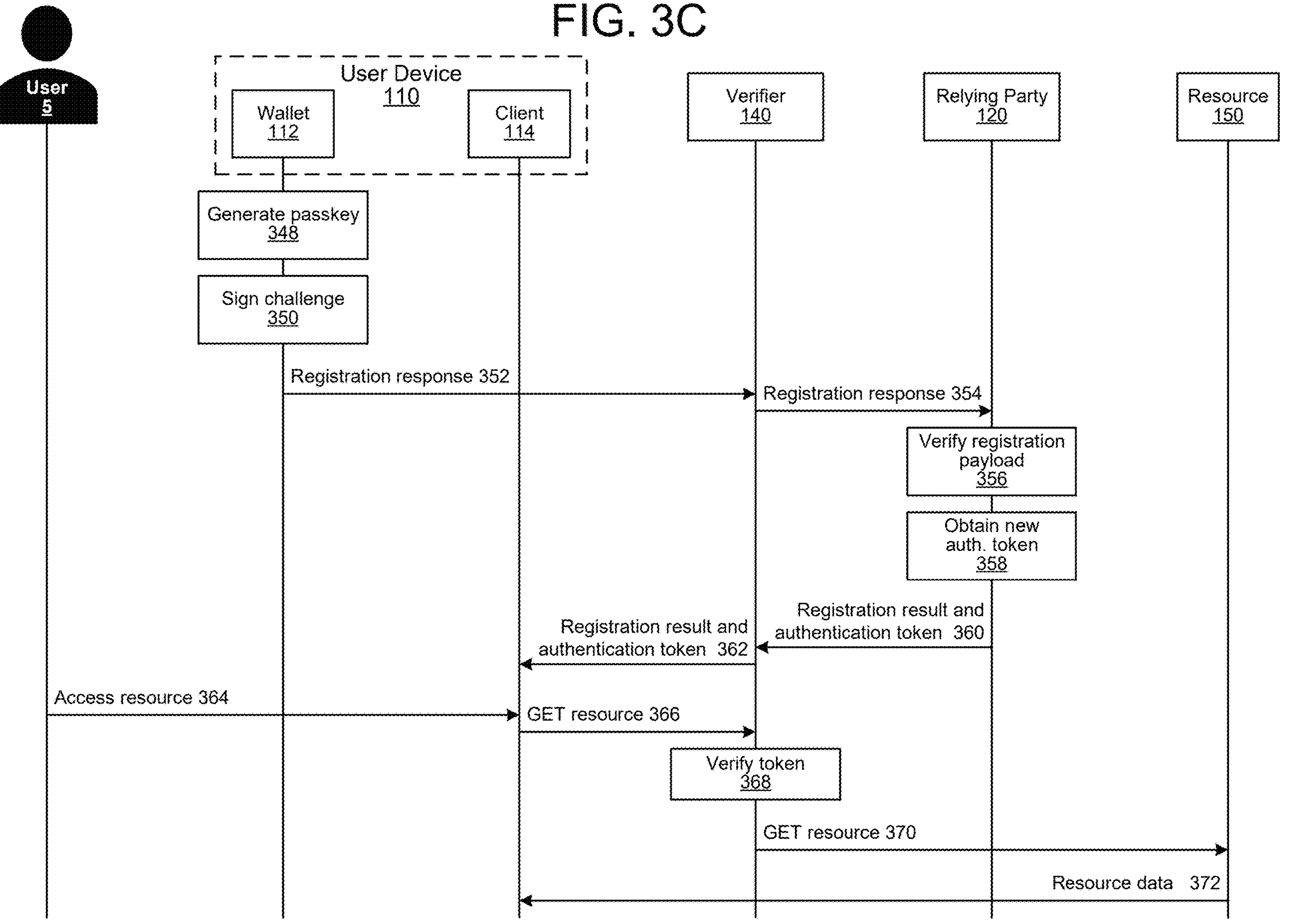
FIG. 3C
User 5
User Device 110
Wallet 112
Client 114
Verifier 140
Relying Party 120
Resource 150
Generate passkey 348
Sign challenge 350
Registration response 352
Registration response 354
Verify registration payload 356
Obtain new auth. token 358
Registration result and authentication token 360
Registration result and authentication token 362
Access resource 364
GET resource 366
Verify token 368
GET resource 370
Resource data 372

User
5
51. Visit website
53. QR code (VP specification & passkey challenge)
User Device
110
Wallet
112
Client
114
57. Register passkey,
sign challenge
54. Provide VP
56. Validation response
58. Respond to challenge
Verifier
140
55. Verify VP,
confirm enrollment
Relying party
120
52. Create challenge
59. Register passkey Resource system(s) 150
Relying party 120
Token generator 620
Verifier 140
User Device 110
Wallet 112
Client 114
User 5
61. Share passkey, signed challenge
62. Verify signature
63. Authentication
64. Token
65. Token
66. Token
67. Token
68. Resource data

FIG. 7

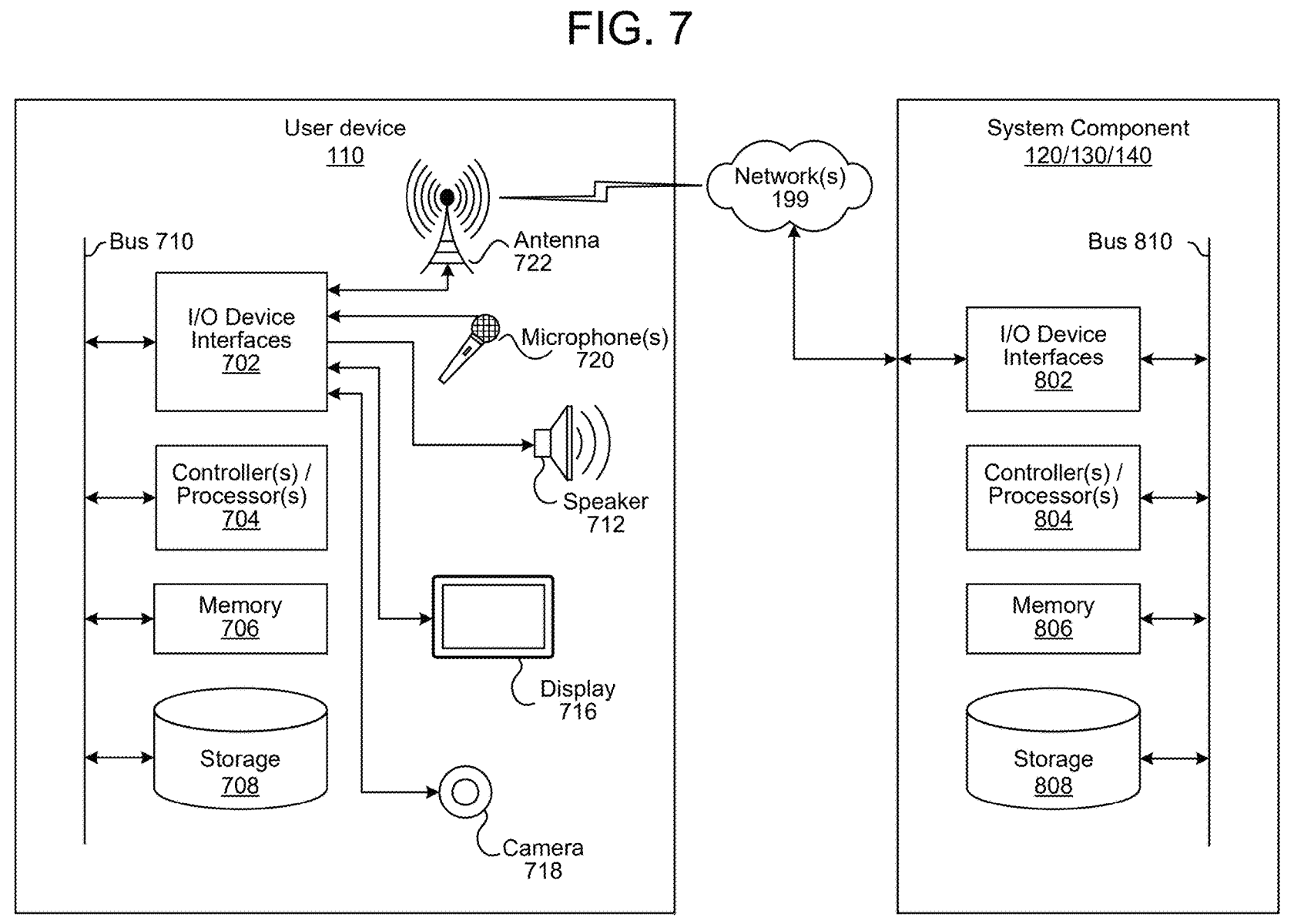

User device
110

Antenna
722

Microphone(s)
720

Speaker
712

Display
716

Camera
718

I/O Device
Interfaces
702

Controller(s) /
Processor(s)
704

Memory
706

Storage
708

Bus 710

Network(s)
199

System Component
120/130/140

Bus 810

I/O Device
Interfaces
802

Controller(s) /
Processor(s)
804

Memory
806

Storage
808

SECURE ENROLLMENT OF PASSKEYS WITH VERIFIABLE CREDENTIALS

CROSS-REFERENCE TO RELATED APPLICATION

This application claims the benefit of priority of U.S. Provisional Patent Application No. 63/705,357, filed Oct. 9, 2024, and entitled "Secure Enrollment of Passkeys with Verifiable Credentials," the content of which is incorporated herein by reference in its entirety.

BRIEF DESCRIPTION OF DRAWINGS

For a more complete understanding of the present disclosure, reference is now made to the following description taken in conjunction with the accompanying drawings.

FIGS. 3A through 3C are signal flow diagrams illustrating example operations of securely enrolling passkeys with verifiable credentials, according to embodiments of the present disclosure.

FIG. 7 is a block diagram illustrating an example client device and system component communicating over a computer network, according to embodiments of the present disclosure.

DETAILED DESCRIPTION

Figure 1:
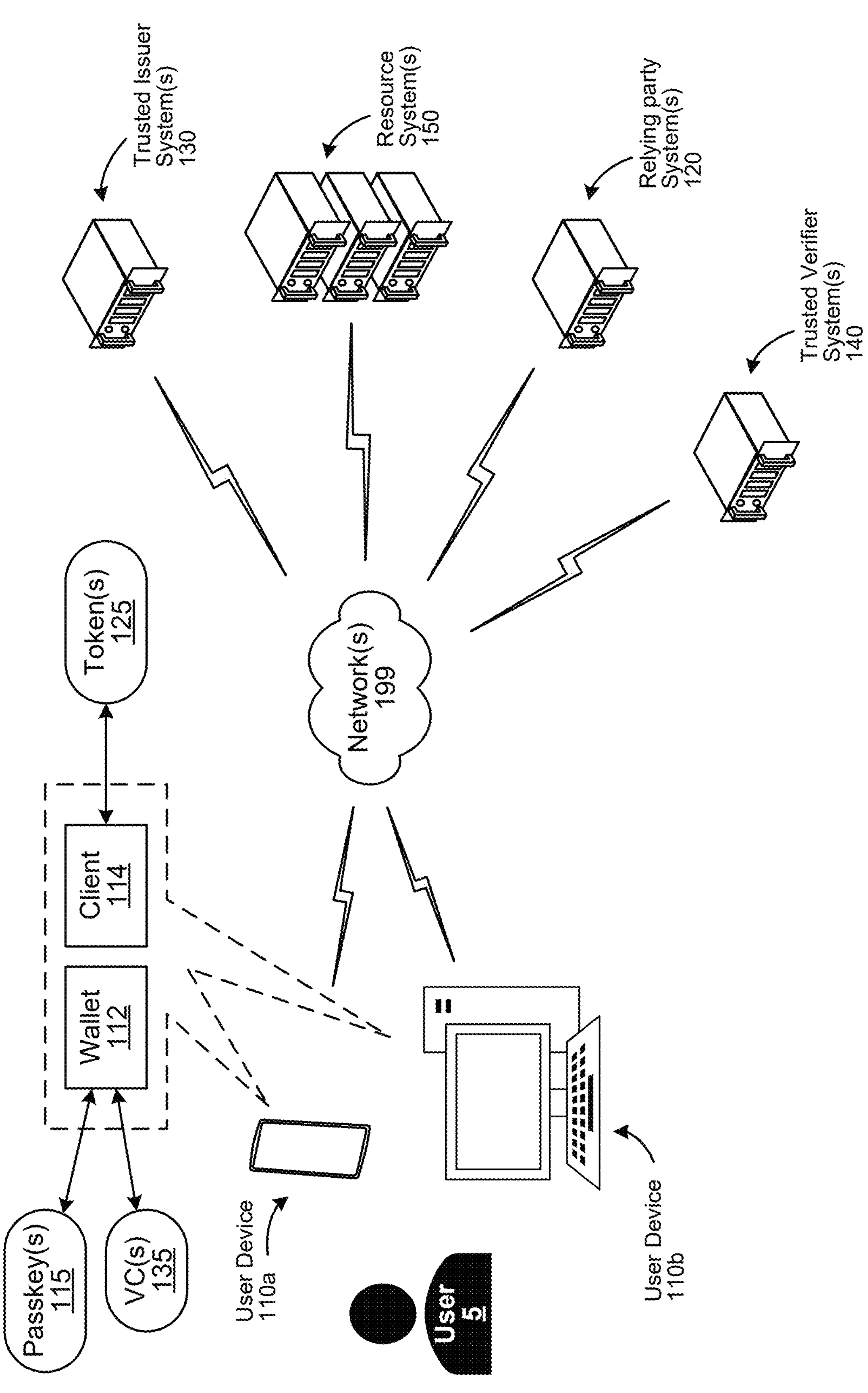
FIG. 1 is a conceptual diagram illustrating secure enrollment of passkeys with verifiable credentials, according to embodiments of the present disclosure.

Passkeys can present a more secure alternative to passwords for controlling access to digital resources such as websites, webapps, and other online services. Passkeys use public-key cryptography to create a credential that may be used in place of a password. A passkey may have two parts, a private key stored on a user device that may be used to request access to the resource, and a public key that may be used verify such requests. To prevent confusion with other cryptographic keys discussed herein, a "passkey" may refer to the private key, a "passkey pair" may refer to the private key and the corresponding public key, and "passkeys" (plural) may refer to the use of passkey pairs generally, unless otherwise indicated.

A user may demonstrate possession of a passkey (e.g., the private key of the passkey pair) to gain access to a resource hosted by a resource system. For example, the user may use a user device such as a smartphone or a tablet, laptop, or desktop computer, etc. to request access to the resource, which may be a service, application, data, etc., available over a computer network. The user may provide proof of possession of the passkey. In some cases, the user may authenticate use of the passkey by, for example, entering a personal identification number (PIN), providing a biometric input, using an authenticator app for multi-factor authentication (MFA), etc. Upon approval, the user device may demonstrate possession of the passkey in a secure way by, for example, digitally signing a cryptographic challenge. If the passkey is successfully verified (e.g., using the corresponding public key of the passkey pair), the requested access may be granted.

Importantly, none of the user's PIN, biometrics, or other credentials need to be shared with the relying party. This reduces or eliminates an attacker's ability to obtain the user's credentials. Moreover, even if an attacker were able to obtain the user's credentials, the attacker would not be able to circumvent the passkey sign-on process. Thus, in many cases passkeys provide a faster and more secure means of accessing resources. Despite the advantages of passkeys, however, enrollment and management processes create friction that hinders wider passkey adoption.

Offered herein are systems and methods for secure enrollment of passkeys using verifiable credentials (VCs) that can reduce the exposure of the user's private key used for signing VCs, streamline enrollment, simplify passkey cancelation, and enable isolated (e.g., per-app, per-service, etc.) user management with tokenized authorization.

Passkey enrollment may involve generating a passkey pair and sharing the public key with a verifier system and/or a relying party for use in verifying requests originating from the holder of the private key. In an example implementation, a user device such as a smartphone, tablet, laptop or desktop computer, etc., may have a digital wallet capable of storing and presenting VCs and functioning as a passkey authenticator. A digital wallet is a device, or software executing on device, that allows a user to engage in electronic transactions with another party. A digital wallet may also be capable of storing and proving the possession of the user's credentials. A user may enroll their device for use in accessing the resource by using their digital wallet to generate a passkey pair. Following a successful enrollment, the user may use the passkey to authenticate with the relying party. If authentication is successful, the relying party may provide an authentication token, which the user device may use to access the resource for a period of time.

The system may initiate passkey enrollment when a user requests access to a resource associated with a relying party system. The user may request access to the resource using a client application (e.g., a web browser or app) executing on their user device. If a passkey is not already enrolled, the resource system may redirect the client to a verifier system that can facilitate enrollment. The verifier system can provide a quick-response (QR) code (or other presentation of encoded data) containing a request for a verifiable presentation (VP) to be generated by the digital wallet. A VP may be data that includes (and/or demonstrates possession of) VCs previously obtained from a trusted issuer. The verifier system may encode a specification for generating the VP into the QR code. The VP may include the digital signature of the trusted issuer and/or the party presenting the VP. In some cases, for example, when the VCs include sensitive or non-public information, the digital wallet may generate the VP in the form of a zero-knowledge proof (ZKP, described further below), which may demonstrate possession of the VCs without necessarily divulging the VCs to the party receiving the VP. In some cases, the VP may be encrypted.

The user may scan the QR code using digital wallet. The digital wallet may verify the request and prompt the user for approval to digitally sign a response. Following approval, the digital wallet may create the VP using the VCs previously obtained from the trusted issuer. The digital wallet may send the VP to the verifier system. The verifier system can verify the VP, retrieve information about passkey pair generation from the relying party system, and forward the information to the digital wallet. The digital wallet can use the information to generate the passkey pair, and the digital wallet may store the passkey (e.g., the private key of the passkey pair) securely for future use. The digital wallet may use the passkey to sign a digital challenge. In some cases, the relying party may impose additional conditions on passkey generation and/or use. For example, the relying party may specify that the user is to authenticate the passkey by, for example, confirming approval, providing identification, entering a personal identification number (PIN), providing a biometric input (e.g., a fingerprint or facial recognition scan, etc.), using an authenticator app for multi-factor authentication (MFA), etc. The user device may prompt the user to approve and/or authenticate the generation or use of the passkey. Upon approval and/or authentication, the digital wallet may generate a registration response containing the signed challenge, public key, and, when specified, an indication of the user's authentication. The digital wallet may send the registration response to the verifier system, how may forward the registration response to the relying party system. The relying party system may verify the signed challenge, and any conditions imposed on the passkey generation. Upon successful verification, the relying party may associate the passkey with the account profile corresponding to the user and/or the VCs used to enroll the passkey.

Once enrolled, the user may access the resource by proving possession of the passkey. Upon verifying the registration, the relying party system may obtain an authentication token, which may include information about the identity of the holder and/or permissions granted to the holder with respect to the resource. The relying party system may send the authentication token to the user device, which may store the authentication token and use it to obtain continued access to the resource for a period of time. When the user attempts to access the resource, they may reveal the authentication token to the verifier, who may verify the authentication token by, for example checking its digital signature and/or determining the parameters of access. Upon verifying the token, the verifier may grant the requested access to the resource. The user need not re-enroll a passkey pair or provide the existing passkey with each request as long as the authentication token remains valid (typically for a predetermined period of time such as a few minutes to a few weeks, unless revoked).

The system may allow for isolated user management. For example, the issuer may revoke VCs by publishing a list of revoked VCs, which may serve to alert other parties that passkeys corresponding to those VCs are no longer valid. Similarly, the verifier system and/or the relying party system may maintain a list of valid or revoked passkeys and/or authentication tokens, and reject requests associated with revoked passkeys or tokens. If the user device is lost or compromised, the digital wallet may disable the passkey to prevent nefarious use. While the passkey is still valid, however, the user may use it to obtain a new authentication token when the previous token expires.

The system may also allow a user to regain access to their account even if they lose their passkey (e.g., by losing or resetting their user device, or by deleting the passkey from the user device). Generally, when a user loses their passkey, they may lose future access to the corresponding account. But with this system, the user may use their VCs (if still valid) to enroll a new passkey for the same account, without losing continuity of any account-specific data or functions. Additionally, a user may use the same VCs to generate passkeys for different user devices, allowing them to access the same account from the different devices using the same credentials.

Various use cases of the described system are possible. These features may be used alone or in combination with each other and/or other features described herein. Various operations of the systems and devices may be subject to user approval. The system may be implemented in a manner that ensures compliance with applicable laws, regulations, standards, etc., in the region(s) where the user, devices, and/or systems are located.

FIG. 1 is a conceptual diagram illustrating secure enrollment of passkeys with verifiable credentials, according to embodiments of the present disclosure. A user 5 may have a user device 110 with which the user 5 accesses various resource systems 150 across one or more computer networks 199 such as a local-area network (LAN), wide-area network (WAN), the Internet, etc. In some cases, the user 5 may have multiple user devices 110*a*, 110*b*, etc. The user device(s) 110 may include components as illustrated in FIG. 7 and described further below. The user device 110 may interact across the computer network(s) 199 with one or more trusted issuer systems (issuer 130), resource system(s) 150, relying party systems (relying party 120), and/or trusted verifier systems (verifier 140). The issuer 130, relying party 120, resource system(s) 150, and/or verifier 140 may include one or more system components 120, 130, and/or 140 as illustrated in FIG. 7 and described further below.

The user device(s) 110 may include a digital wallet 112 and a client 114. The digital wallet 112 and/or the client 114 may be software components stored in a memory of the user device 110 and executing on a processor (or processors) of the user device 110. The digital wallet 112 may obtain and store VCs 135 from the issuer 130. The digital wallet 112 may also act as an authenticator to enroll a passkey pair for accessing the relying party 120. In some implementations, a user's passkey 115 may be stored on multiple user devices 110*a*, 110*b*, etc., corresponding to the same user 5. For example, if the user 5 wishes to transfer their passkey 115 to another device 110, the user 5 can obtain a new VC from the issuer 130 and link the VCs from the respective user devices 110.

The client 114 may be, for example, a browser, app, or other software executing on the user device 110. The user 5 may use the client 114 to request access to a resource system 150 associated with a relying party 120. Following enrollment, the relying party 120 may verify the user's passkey 115 (e.g., using the corresponding public key of the passkey pair) and provide an authentication token 125, which the client 114 may store (e.g., in a memory of the user device 110) and use to obtain continued access to the resource for a period of time (e.g., until the token 125 expires or is revoked).

Prior to enrolling a passkey pair, the user 5 may first obtain VCs 135 from the issuer 130. The issuer 130 may be, for example, an identity provider (IdP). The issuer 130 may be a system entity that creates and manages identity information for principals such as the user 5, the user device 110, and/or individual computational entities such as processes and threads. The VCs 135 may indicate an attribute of the holder such as identity, age, association with various entities, etc. Relying parties 120 may outsource user authentication to the issuer 130. Thus, once the user 5 establishes their identity with the issuer 130 and receives the VCs 135, the user 5 may use the VCs 135 to authenticate themselves with various relying parties 120. Thus, in some cases, the issuer 130 can allow for a user 5 to user single sign-on (SSO) to access various resource systems 150 associated with different relying parties 120. The user device 110 may receive the VCs 135 and store them in the digital wallet 112.

The user 5 may use the VCs 135 obtained from the issuer 130 to obtain access to resource system(s) 150 associated with one or more relying parties 120. A resource system 150 may host one or more resources such as a website or service requiring authorization. If the user 5 requests access to a resource system 150 (e.g., using the client 114), the user 5 may be prompted to present their authentication token 125 or passkey 115. If the user 5 does not yest have an authentication token 125 or passkey 115, the request may be redirected to the verifier 140 for enrollment of a new passkey pair.

The verifier 140 may be a front-end service different from the resource system(s) 150 that the user 5 seeks to access. The verifier 140 may act as an intermediary to verify the user's VCs 135 and facilitate passkey enrollment. The verifier 140 may present a QR code to the client 114 that the user 5 may scan with the digital wallet 112. in some implementations, the verifier 140 may encode and/or present the data in some other way; for example, as a bar code, a string of characters, etc. The verifier 140 may send the QR code to the client 114 in the form of image data. In some implementations, the data may be encoded in a different form, such as a bar code. In some implementations, the verifier 140 may send the data in some other form such as character (e.g., text) data from which the client 114 can render the QR code (or other representation of the data). In some implementations, the client 114 may display the data as a string of characters that may be scanned by the digital wallet 112 (e.g., using optical character recognition). The string may be or contain a uniform resource locator (URL). In some implementations, the QR code may include a cryptographic challenge generated by the relying party 120. The challenge, described in further detail below, is a security mechanism used to secure communication between the user device 110 and the verifier 140 and/or the relying party 120. Upon scanning the QR code, the digital wallet 112 may prompt the user 5 for approval to create a verifiable presentation (VP) and return it to the verifier 140. Subject to user 5 approval, the digital wallet 112 may generate the VP using the VCs 135. The VP serves to demonstrate possession of the VCs 135 without necessarily divulging the VCs. The verifier 140 may verify the VP and, if successful, initiate the passkey enrollment process.

The verifier 140 can provide the client 114 with passkey creation options ("options"), which convey information for generating a passkey 115. The passkey may be a credential created using public key cryptography, and the options may indicate the format and/or protocol to be used to generate the passkey pair. For example, the passkey may correspond to a Fast Identity Online (FIDO) specification such as the FIDO2 standard. The verifier 140 may obtain the options from the relying party 120 by sending a PublicKeyCredentialCreationOptions request. The relying party 120 may generate the PublicKeyCredentialCreationOptions, and send the options back to the digital wallet 112 via the verifier 140.

The PublicKeyCredentialCreationOptions is an object specified by the WebAuthn standard for use when generating a public key credential such as a passkey pair. An instance of a PublicKeyCredentialCreationOptions object includes various properties that may be specified by the relying party to, for example, impose conditions on the generation of the passkey such as specifying whether and/or how a user is to authenticate generation of the passkey. The object may include a cryptographic challenge, generated by the relying party, and used to create a secure channel with the digital wallet 112. Additionally or alternatively, the relying party 120 may provide the cryptographic challenge to the verifier 140 earlier to allow the verifier 140 to embed the cryptographic challenge in the QR code. The object may also include a list or array of existing credentials mapped to the user account to avoid creating a new passkey when there is already a valid passkey associated with the user account.

The digital wallet 112 may prompt the user for approval and/or authentication to generate the passkey pair. The user 5 may provide the approval/authentication by selecting a "confirm" button, providing a PIN, password, biometric input, a specific gesture, MFA, or the like. Upon the user's approval/authentication, the digital wallet 112 may generate the passkey pair using a cryptographic algorithm specified by the options. The passkey pair may include a pair of long, mathematically related random numbers. One number will be the user's private key (e.g., the passkey 115) used for accessing the resource system(s) 150, and the other will serve as a public key that the verifier 140 and/or the relying party 120 can use to verify the passkey 115. Thus, although a passkey pair includes the public/private key pair, the "passkey 115" refers to the private key unless otherwise indicated. The digital wallet 112 may generate a registration response. The registration response may have a payload that includes the cryptographic challenge digitally signed using the passkey 115. When applicable, the payload may also include an indication that the passkey generation complied with the conditions imposed by the options.

The digital wallet 112 may return the registration response to the verifier 140, which may forward the registration response to the relying party 120. The relying party 120 may verify the registration response payload by, for example, verifying that the challenge was properly signed and that the passkey generation process complied with the conditions imposed by the relying party. If the relying party 120 successfully verifies the registration payload, the relying party 120 may obtain (and/or generate) an authentication token 125. The authentication token 125 may be a package of data that may include a header, payload, and/or signature. The payload may be data that represents one or more "claims" about the identity of the holder and/or permissions granted to the holder with respect to a resource. An example claim may be "logged in as user." Other claim fields may include the issuer, subject, expiration, permissions granted/not granted, etc., of the token. In some cases, the issuer (e.g., the relying party 120) may encrypt the payload to hide its contents and/or digitally sign the authentication token 125 to evidence provenance. The relying party 120 may digitally sign the authentication token 125 using a private key. In some implementations, the authentication token 125 may be, for example, a JavaScript Object Notation (JSON) Web Token (JWT). JSON is an open standard file format that may use human-readable text to store and transmit data. A JWT is a proposed Internet standard for creating data with a JSON payload, with optional encryption and/or digital signature.

The authentication token 125 may grant the user access to the resource for a period of time or indefinitely, but may be subject to revocation. During the life of the authentication token 125, the user 5 may continue to access the resource without having to repeat enrollment.

Figure 2:
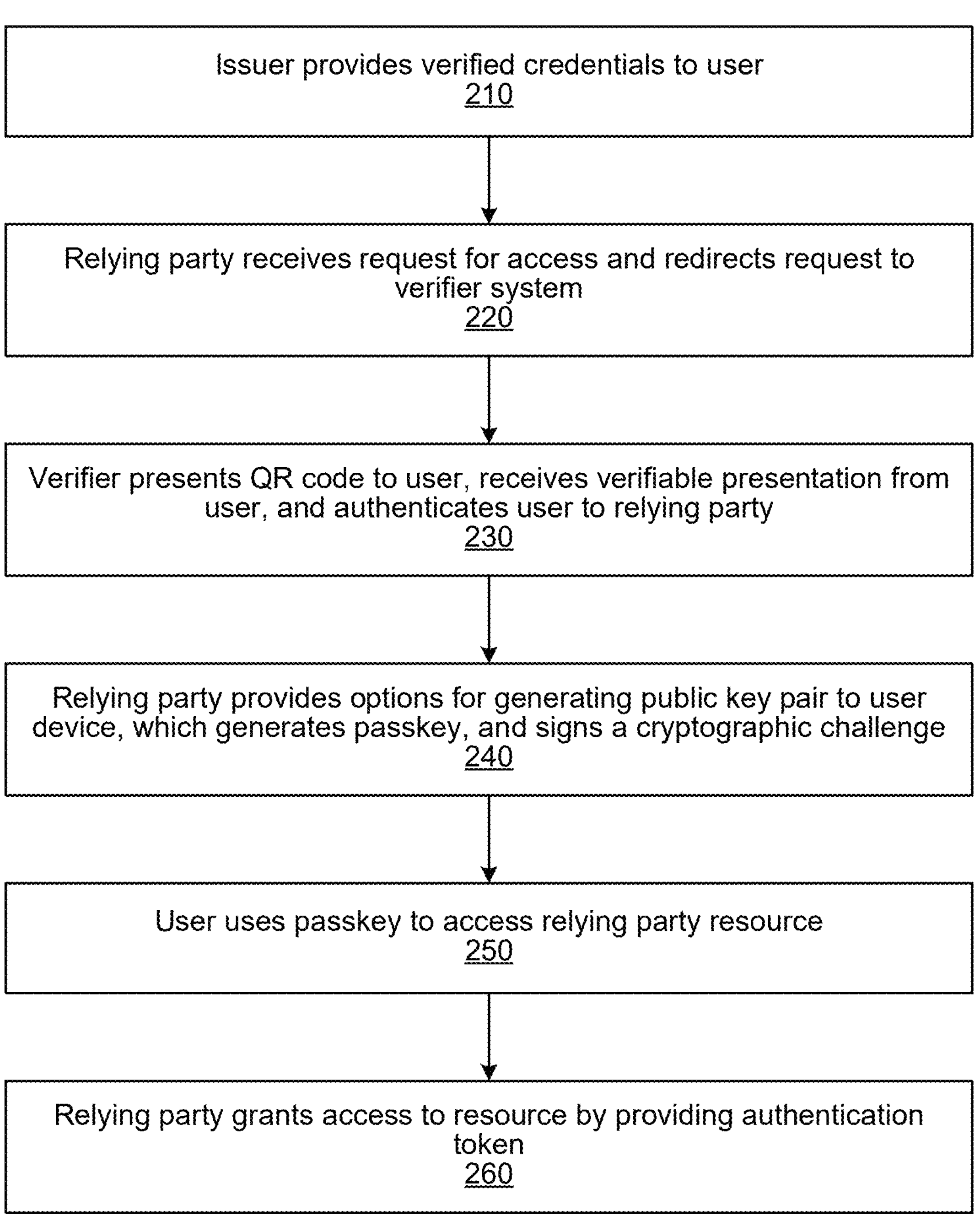
FIG. 2 is a flowchart illustrating example stages of securely enrolling passkeys with verifiable credentials to access a resource, according to embodiments of the present disclosure.

Thus, the passkey enrollment process may include the several stages illustrated in FIG. 2, according to some embodiments of the present disclosure. In a first stage 210, a trusted issuer may provide verified credentials to a user and/or a user device. The VCs may be stored in a digital wallet of a user device. In a second stage 220, the user may request access to a resource associated with a relying party system. The request may be redirected to a verifier system. In a third stage 230, the verifier system may present the user device with a QR code for initiating the verification process. The digital wallet may scan the QR code and, subject to user approval, generate a VP demonstrating possession of the VCs. In some cases, the VP may include the digital signature of the trusted issuer and/or the digital wallet. In some cases, the VP may be a ZKP, described further below, which may demonstrate possession of the VCs without necessarily divulging the VCs to the relying party and/or any other party that may observe the VP, either through legitimate or nefarious means. The verifier system may receive the VP and authenticate the user to the relying party system. In a fourth stage 240, the verifier system may obtain PublicKeyCredentialCreationOptions for generating a passkey pair from the relying party and send the options to the digital wallet. The digital wallet may use the options to generate the a passkey pair. The digital wallet may send a registration response to the relying party. The registration response may include the public key of the passkey pair, and the digital wallet may securely store the private key of the passkey pair on the user device 110. The registration response may include a cryptographic challenge (e.g., generated by the relying party) signed using the passkey. The registration response may further include confirmation that the digital wallet obtained the identity and/or approval of the user 5 as specified in the PublicKeyCredentialCreationOptions (e.g., a biometric input, PIN, etc.). In a fifth stage 250, the user may use the passkey to access the resource system associated with the relying party system. In a sixth stage 260, the relying party system may verify the passkey and grant the requested access by providing an authentication token to the user device. The authentication token may grant the user device access to the resource for a predetermined amount of time or until the authentication token (or the passkey or VCs) is revoked.

This passkey enrollment process reduces the friction of registering users 5/user devices 110 in the passkey system, which may promote passkey adoption and increase the security of relying party systems. The passkey enrollment process leverages a user's existing VCs, which may obviate the need for separate identity verification. The use of VPs and authentication tokens may further minimize exposure of the VCs and/or passkey 115 because the private key used to sign VCs 135 (e.g., to generate the VP for verification by the verifier 140) need not be exposed to the relying party 120 or any other third party.

The passkey enrollment process may also allow the user 5 to access the resource system(s) 150 using their account (e.g., associated with certain VCs 135) from multiple user devices 110*a*, 110*b*, etc. Typically, a passkey 115 is bound to a single digital wallet 112 or user device 110; however, the system may be used to enroll passkeys 115 on multiple different user devices 110 using the same VCs 135 and the operations described herein. Policies of the relying party 120, verifier 140, and/or issuer 130 may specify how many and/or what type of user devices 110 a user may enroll passkeys for. If the user 5 attempts to enroll more than this number of passkeys/user devices, one or more of the parties may revoke some or all of the VCs 135, passkeys 115, and/or corresponding authentication tokens 125.

The system may also allow the user 5 to generate a new passkey 115 if a previous passkey is lost. Generally, when a user loses their passkey, they may lose future access to the corresponding account. But with this system, the user 5 may enroll a new passkey for the same account, without losing continuity of any account-specific data or functions.

The system may allow for isolated user management. For example, the authentication tokens 125 may be issued with validity periods limited to several minutes or days, and may be issued to authorized only specific applications or services. A relying party 120 may revoke an authentication token 125 without revoking the passkey 115, and a relying party 120 and/or the issuer 130 may revoke a passkey without revoking the VCs. For example, the relying party 120 may revoke the passkey 115 by refusing a corresponding authentication token 125 and rejecting requests to generate new authentication tokens 125 based on the passkey 115.

In addition, the system may allow for easy passkey cancelation. The trusted issuer may revoke VCs by publishing a list of revoked VCs, which may serve to alert other parties that passkeys corresponding to those VCs are no longer valid. If the user device 110 is lost, stolen, or otherwise compromised, the digital wallet 112 may disable the passkey(s) 115 (e.g., after a certain number of failed PIN entries). The relying party 120 and/or verifier 140 may revoke the passkey(s) 115 on its own accord and/or based on the list of revoked VCs. The relying party 120 and/or the verifier 140 may remove the public key corresponding to the passkey 115 from a registry of valid passkeys and/or add the public key to a list of revoked passkeys.

FIGS. 3A through 3C are signal flow diagrams illustrating example operations of securely enrolling passkeys with verifiable credentials, according to embodiments of the present disclosure. The operations may occur between a user device 110, an issuer 130, resource system 150, relying party 120, and/or a verifier 140. A user 5 may operate their user device 110, which may have a digital wallet 112 and/or a client 114 executing on the hardware of the user device 110.

The user device 110 may receive (302) VCs from the issuer 130, and store them securely in the digital wallet 112. The user 5 may request (304), via the client 114, access to a resource system 150. The client 114 may send (306) the request to the resource system 150. The resource system 150 may check to see if the user device 110 possesses a currently valid authentication token 125 or passkey 115. If not, the resource system 150 may redirect (308) the client 114 to the verifier 140, which will facilitate passkey enrollment of the user 5/user device 110.

The client 114 may load (310) a login page of the verifier 140 (e.g., using a GET command). The verifier 140 may return (312) a QR code (or other form of encoded data) to the client 114. The QR code may contain a request for a VP of a specific VC. In some implementations (e.g., Option 1), the QR code may include a cryptographic challenge provided by the relying party 120 (e.g., which is associated with the resource system 150). The cryptographic challenge may be used to secure communication between the user device 110 and the relying party 120 and/or the verifier 140 by verifying their respective identities. The relying party 120 may dynamically generate the challenge in response to the access request sent at step 306 using a random or pseudo-random value such that a response cannot be reused maliciously if captured (e.g., in a "replay attack."). An example of embedding a challenge in a QR code is described in further detail below with reference to FIG. 5. In some implementations, the verifier 140 may send the cryptographic challenge following verification of the VP at step 326 described below. An example of presenting the challenge following verification of the VP is described in further detail below with reference to FIG. 4.

The client 114 may present (314) the QR code to the user 5. The digital wallet 112 may prompt (316) the user 5 for approval to scan the QR code. The user 5 may use the digital wallet 112 to scan (318) the QR code. The digital wallet 112 may process the QR code to determine what VCs are requested and how to create a VP of possession of the requested VCs. The digital wallet 112 may again prompt (320) the user for approval to create the VP. The user 5 may approve (322) creation of the VP. The digital wallet 112 may create the VP using the VCs and the information contained in the QR code, and send (324) the VP back to the verifier 140.

In some implementations, the digital wallet 112 may create the VP using a zero-knowledge proof (ZKP). A ZKP may allow the user 5 to selectively disclose the VCs to prove the user's identity or attributes without revealing their identity or unnecessary personal information. In this way the user may establish themselves as verified but anonymous for purposes of enrolling a passkey. If the VCs do not contain or pertain to sensitive info, however generating a ZKP may be unnecessary.

A ZKP allows a party to prove a claim without revealing any additional information. For example, a "prover" (in this case, the digital wallet 112) can share a proof of the claim with a "verifier" (e.g., the verifier 140) who can verify the accuracy of the proof. A ZKP may not prove the claim with certainty, but the acts of proving and verifying may be repeated until the prover demonstrates to the verifier (and, in some case, an external observer or observers) a sufficiently high statistical likelihood that the claim is true, rather than a series of lucky guesses.

A ZKP of a claim may satisfy three properties: completeness, soundness, and zero-knowledge. Completeness means that if the claim is true, an honest prover can convince an honest verifier of the claim. Soundness means that if the claim is false, no cheating prover can convince an honest verifier of the claim (e.g., except for some very small probability, which may be reduced by further iterations of proof). Zero-knowledge means that if the claim is true, no verifier (or observer) will learn anything other than the fact that the claim is true.

A ZKP may be interactive or non-interactive. An interactive proof system may involve a repeated exchange of messages between the prover (e.g., the user device 110) and the verifier (e.g., the verifier 140 and/or the relying party(s) 120). In an interactive proof system, it may be assumed that the user device 110 has access to abundant computational resources but cannot be trusted. In contrast, the verifier 140 may be assumed to be trustworthy but have limited computational resources. The interactive proof system may also involve an ability of the verifier 140 to make random choices. Through an exchange of messages, the user device 110 may establish a near-certain likelihood that its claim is true, without divulging any information beyond the fact of the truth of the claim. For example, the verifier 140 may determine that receiving N consecutive verifiable proofs from a user device 110 makes the probability that the user device 110 is asserting a false claim exceedingly low. The verifier 140 and/or the relying party(s) 120 may select a value of N and/or a threshold confidence score (e.g., corresponding to a likelihood that the user device 110 possesses the credentials it asserts) based on, for example, the potential harm of a bad actor deceiving the verifier 140, accessing the relying party(s) 120, and/or the sensitivity of the data stored therein. An example of a zero-knowledge protocol that may be used to perform an interactive ZKP is a zero-knowledge Scalable Transparent Argument of Knowledge (zk-STARK); however, some versions of zk-STARK may operate non-interactively.

A non-interactive ZKP may offer advantages over interactive proofs. For example, a non-interactive proof may be used when the prover and verifier cannot interact (e.g., communicate in real time). Thus, non-interactive proofs may be useful in decentralized systems such as a distributed ledger system made up of the distributed nodes. The distributed nodes may use the ZKP to verify transactions (e.g., adding new policies to the ledger) without oversight of a central authority. For example, a distributed node may verify that the issuer 130 (and/or other component of the system) is authorized to write policies, public keys, and/or other data to the distributed ledger system. An example of a non-interactive zero-knowledge protocol is a zero-knowledge Succinct Non-interactive Argument of Knowledge (zk-SNARK). A ZKP protocol (e.g., such as zk-SNARK, zk-STARK, and/or others) may be transparent and/or universal. A transparent protocol is one that does not require a trusted setup but may rely on public randomness. A universal protocol is one that does not require a separate trusted setup for each arithmetic circuit, where an arithmetic circuit represents a directed acyclic graph involving the addition and/or multiplication of numbers; for example, to compute a polynomial. In some implementations, the ZKP may involve a post-quantum protocol that is not vulnerable to known attacks involving quantum algorithms.

In some implementations, the issuer 130 (or other entity) may provide a trusted setup for the ZKP. In some implementations, a different component (e.g., independent of the verifier 140, user device 110, and the relying party(s) 120) may provide the trusted setup. For example, the issuer 130 may send a prover setup to the user device 110 and a corresponding verifier setup to the verifier 140. The prover setup and the verifier setup may be collectively referred to as a "trusted setup". In some implementations, the prover setup may be data representing, for example, a prover key and/or a structured reference string. In some implementations, the verifier setup may be data representing, for example, a verifier key and/or a structured reference string. The trusted setup may facilitate the ZKP between the user device 110 (e.g., the prover) and the verifier 140 (e.g., the verifier). A ZKP may be used by the user 5 to establish to the verifier 140 that the user 5 possesses credentials that correspond to policies for access of the relying party(s) 120. By using the ZKP, the user 5 may keep their exact identity hidden from the verifier 140, the relying party(s) 120, and/or any observer(s) of the data that passes between the user device 110 and the verifier 140. An observer may, however, be permitted to witness the operation(s) performed and/or the results thereof, and see that the verifier 140 and/or the relying party(s) 120 authorized the operation(s) based on a policy that may also be visible to the observer. The system may therefore balance the interests of privacy for the user 5 and trust on the part of the observer.

In some implementations, the issuer 130 may provide verified credentials (VCs) corresponding to the user 5 to the user device 110. The digital wallet 112 may include a secure (e.g., encrypted) data storage component on and/or associated with the user device 110. The VCs may correspond to one or more attributes about (or assigned to) the user 5. For each attribute ("att"), the issuer 130 may send to the user device 110:

$$\sigma_{att} = \text{sign}_{pk(IdP)}(att\|pk_{Requestor})$$

The user 5 may wish to prove a claim c about an attribute; for example, that the user 5 is over the age of 18, the user 5 is a member of organization ABC, the user 5 is authorized to read, modify, and/or write data to the relying party(s) 120, the user 5 has been granted Tier-2 access but not Tier-1 access, etc., with respect to permissions for use of the relying party(s) 120. As can be appreciated, a number of claims/attributes are possible. The user 5 may prove to the verifier 140, and thus the relying party(s) 120, that c(att) is true, that the issuer 130 certifies that the user 5 has the attribute att, and that att was signed (e.g., that att was used to assert claim c).

The user 5 may fetch the prover setup from the issuer 130. The prover setup may represent a prover key for the corresponding claim $PK_{IdP,c}$ and a structured reference string $SRS_{IdP}$.

Using the prover setup, the digital wallet 112 may build the following proof:

$$P_{att,Requestor,Idp} = \text{Proof}(\sigma_{att} \text{ is valid and } c(att) == \text{true}, PK_{IdP,c}, SRS_{IdP})$$

Which verifies that:

$$\text{verify } (\sigma_{att}, att\|pk_{Requestor}) == \text{true and } c(att) == \text{true})$$

The user device 110 may send the proof $P_{att,Requestor,IdP}$ to the verifier 140. The verifier 140 may fetch the verifier setup (e.g., from the issuer 130). The verifier setup may represent a verifier key for the corresponding claim $VK_{IdP,c}$ and a structured reference string $SRS_{IdP}$. The verifier 140 may then verify the proof P from the user device 110:

$$\text{Verify } (P_{att,Requestor,IdP}, VK_{IdP,c}, SRS_{IdP}) == \text{valid}$$

If the claim c accurately represents the VC(s), the proof P will establish that c(att) is true and/or that the issuer 130 assigned att to the user 5. The verifier 140 may then continue with the passkey enrollment process.

As shown in FIG. 3B, the verifier 140 may verify (326) the VP to determine whether the user 5 possesses the VCs required by the relying party 120. The verifier 140 may send (328) the client 114 an indication that verification was successful and include a cryptographic nonce for the client 114 to sign. A nonce is an arbitrary number used once in a cryptographic communication. The nonce may be a random or pseudorandom number (in some cases including a timestamp) issued as part of an authentication protocol to prevent communications from being captured and reused in a replay attack. In this case, the nonce sent at step 328 is different from the cryptographic challenge generated by the replying party 120 and embedded in the QR code at step 312 or sent at step 338 (described below). The nonce is generated by the verifier 140 and serves to prevent a bad actor from capturing the VP and attempting to use it to register a passkey improperly. The client 114 may sign the nonce using a private key, which may be different from the passkey used to sign the cryptographic challenge at step 350, described below. The client 114 may return (330) the signed nonce to the verifier 140.

The verifier 140 may receive and verify (332) the nonce and the signature. Upon verification, the verifier 140 may request information ("options") from the relying party 120 for creating a passkey pair. The verifier 140 may obtain the information from the relying party 120 by sending (334) a PublicKeyCredentialCreationOptions request. The relying party 120 may generate 336) the PublicKeyCredentialCreationOptions. The passkey options may correspond to, for example, a Fast Identity Online (FIDO) specification such as the FIDO2 standard. The PublicKeyCredentialCreationOptions may specify how the user 5 is to authenticate themselves (e.g., using a PIN, biometric input, multi-factor authentication (MFA), etc.). In some implementations (e.g., Option 2), the relying party 120 may generate a cryptographic challenge, and include it in the PublicKeyCredentialCreationOptions. The relying party 120 may send (338) the options to the verifier 140, which may send (340) the options to the client 114.

The client 114 may instruct (342) the digital wallet 112 to generate a new key pair using the options. The digital wallet 112 may prompt (344) the user 5 to prove their identity and approve key generation by entering their PIN, biometrics, MFA, etc. The user 5 may indicate approval (346) by providing the requested authentication. Upon confirming the user's approval/authentication, the digital wallet 112 may use the options to generate (348) the passkey pair according to the options provided by the relying party 120. The digital wallet 112 may use the passkey 115 to sign (350) the cryptographic challenge, whether the digital wallet 112 received the challenge via the QR code at step 314 (e.g., Option 1), the options at step 342 (e.g., Option 2), or some other channel. The digital wallet 112 may use the passkey, the signed challenge, and any other attestation of conditions specified by the options to generate a registration response. The signed cryptographic challenge may establish the legitimacy of the passkey registration response and thwart any attempts, by the user 5 and/or a bad actor, to submit multiple passkey registrations following verification of the VP.

As shown in FIG. 3C, the digital wallet 112 may send (352) the registration response to the verifier 140. The verifier 140 may forward (354) the registration response to the relying party 120 for verification. The relying party 120 may verify (356) the registration payload to confirm a correct response to the challenge. Payload verification may include verifying the signed challenge and/or that conditions of the challenge have been met (e.g., by the user 5 providing the specified approval, identity, and/or authentication). Upon successful verification, the relying party 120 may obtain (or generate) (358) an authentication token 125. The authentication token 125 may include a payload representing the permissions granted to the user 5 as well as their duration of validity. In some cases, the relying party may encrypt the payload and/or digitally sign the authentication token 125.

The relying party 120 may send (360) the registration result and authentication token 125 to the verifier 140, which may forward (362) the registration result and authentication token 125 to the client 114. The user 5 may use the authentication token 125 to access (364) the resource system(s) 150. When the user 5 requests access, the client 114 may present the authentication token 125 when, for example, using a GET command to fetch (366) a document from the resource system(s) 150 and/or to perform other operations using the resource. The client 114 may send the command(s) to the verifier 140, which may verify (368) the authentication token 125 prior to forwarding (370) the command(s) to the relying party 120. The relying party 120 may return (372) resource data to the client 114. For example, if the command pertained to obtaining data, the relying party 120 may send the requested data to the client 114. If the command pertained to the relying party 120 performing some operation on data, the relying party may send a confirmation that the operations were performed successfully.

The verifier 140 and/or the relying party 120 may revoke the authentication token 125 at any time. Absent explicit revocation, the authentication token 125 may expire after a predetermined duration of time (e.g., several minutes to several days), after which it will no longer be recognized as valid by the verifier 140 and/or the relying party 120.

Figure 4:
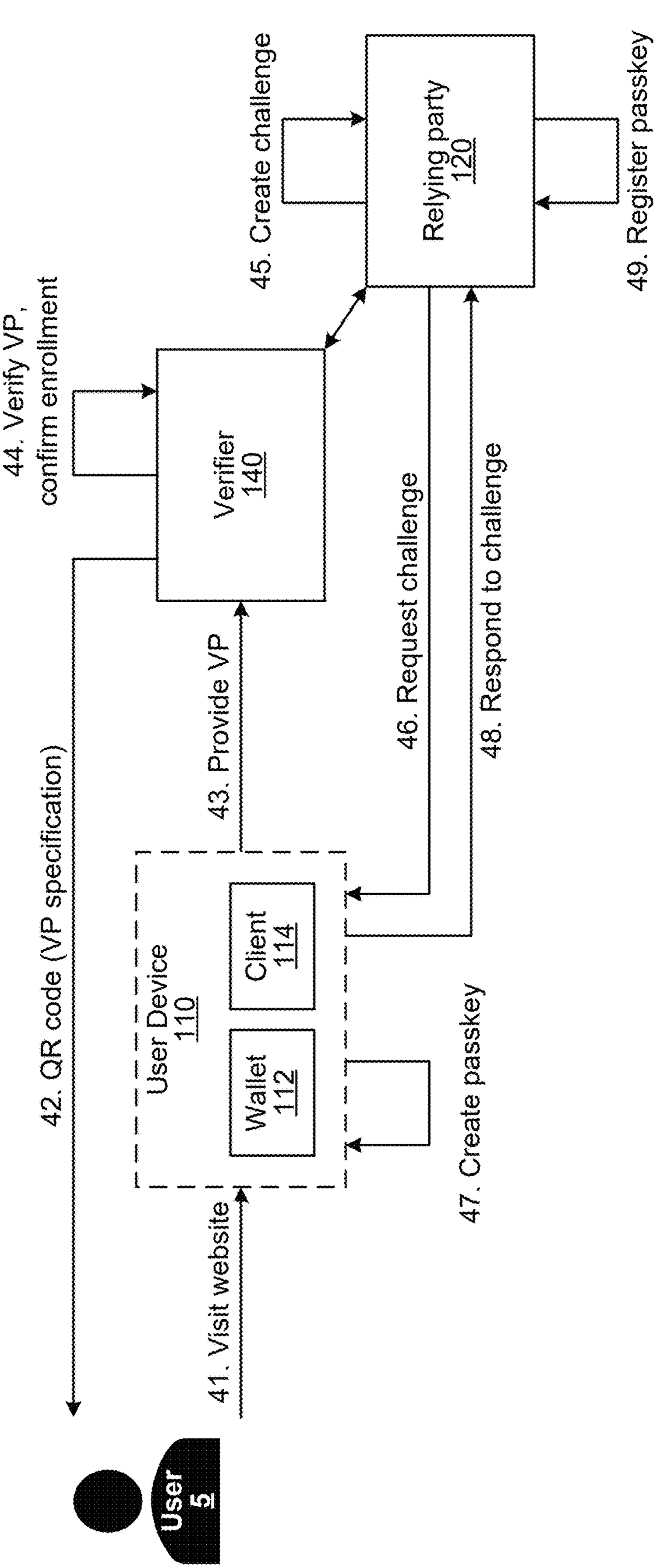
FIG. 4 is a conceptual diagram illustrating first example operations for enrolling a passkey, according to embodiments of the present disclosure.

FIG. 4 is a conceptual diagram illustrating first example operations for enrolling a passkey, according to embodiments of the present disclosure. In this implementation, the Verifier 140 and relying party 120 send the VP specification and cryptographic challenge in separate communications (e.g., Option 2). For example, the user 5 may scan the QR code presented by the verifier 140 to obtain the VP specification, but may receive the cryptographic challenge separately. The verifier 140 may provide the cryptographic challenge via a secure side channel to the digital wallet 112. This may prevent a bad actor from obtaining the value cryptographic challenge by capturing an image of the QR code, URL, and/or other representation of the challenge displayed on the user device 110. As described with reference to FIG. 5 below, however, embedding the cryptographic challenge in the QR code may provide other benefits.

At step 41, the user 5 may visit a resource (e.g., website) hosted by the resource system(s) 150. If the client 114 does not provide a valid authentication token, the resource system(s) 150 may redirect the client 114 to the verifier 140. At a step 42, the verifier 140 may present the client 114 with a QR code containing a specification for a VP. At step 43, digital wallet 112 may scan the QR code and, subject to approval of the user 5, generate the VP and send it back to the verifier 140. At step 44, the verifier 140 may verify the VP and send a confirmation of enrollment to the relying party 120. At step 45, the relying party 120 may create the cryptographic challenge. At step 46, the relying party 120 may send the challenge to the user device 110. At step 47, the digital wallet 112 may create the passkey pair (including a passkey 115 and the corresponding public key), sign the challenge, and, at step 48, return the signed challenge to the relying party 120. At step 49, the relying party may register the passkey (e.g., by adding the public key to a registry of valid passkeys) and provide the client 114 with the authentication token 125.

Figure 5:
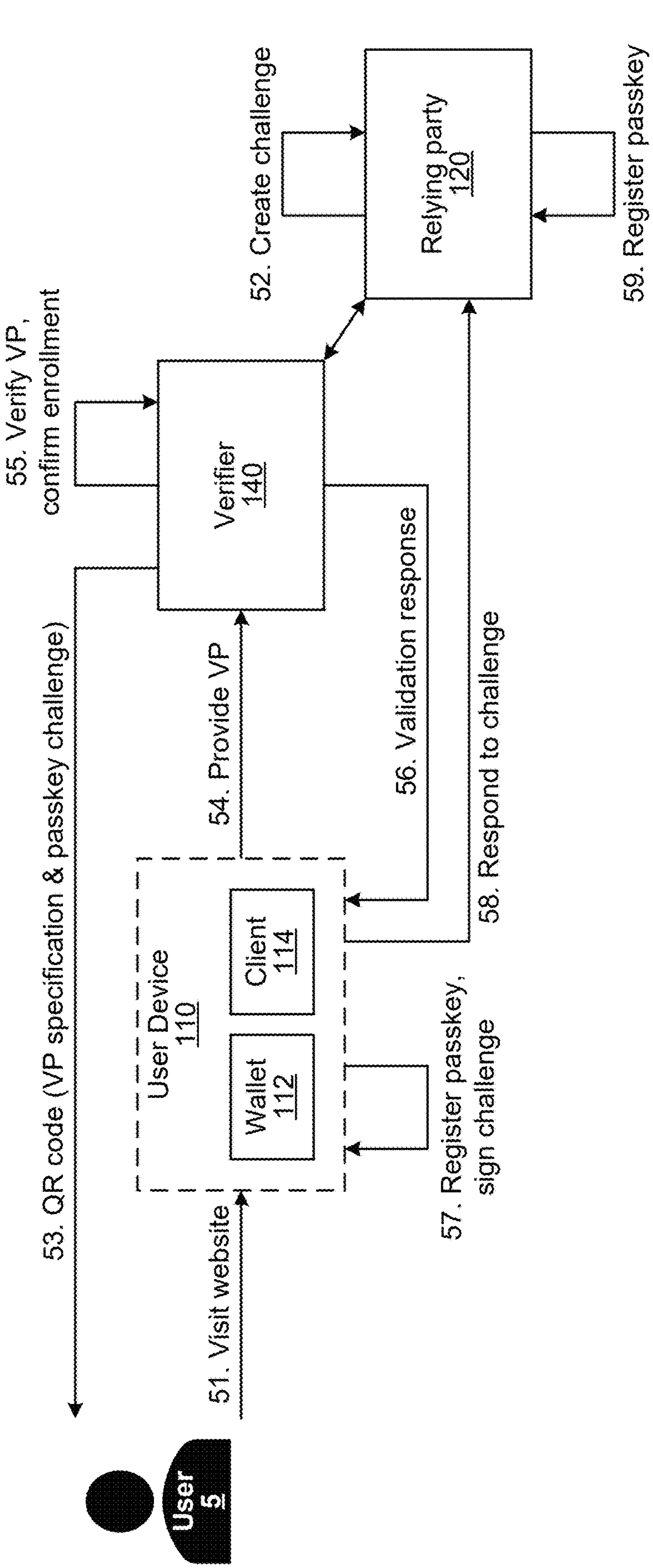
FIG. 5 is a conceptual diagram illustrating second example operations for enrolling a passkey with a challenge embedded in the quick-response code, according to embodiments of the present disclosure.

FIG. 5 is a conceptual diagram illustrating second example operations for enrolling a passkey with a challenge embedded in the quick-response code (e.g., Option 1), according to embodiments of the present disclosure. Embedding the cryptographic challenge in the QR code can make enrollment more secure and efficient by reducing the number of interactions between parties, which also reduces opportunities for certain types of attack like replay attacks; however, if the user device 110 is visible to an observer, the observer may capture the QR code and thus the challenge.

At step 51, the user 5 may visit a resource (e.g., website) hosted by the resource system(s) 150. If the client 114 does not provide a valid authentication token, the resource system(s) 150 may, at step 52, create a cryptographic challenge, and redirect the client 114 to the verifier 140. At a step 53, the verifier 140 may present the client 114 with a QR code containing a specification for a VP and the cryptographic challenge generated at step 52. At step 54, digital wallet 112 may scan the QR code and extract the cryptographic challenge. The digital wallet 112 may, subject to approval of the user 5, generate the VP and send it back to the verifier 140. At step 55, the verifier 140 may verify the VP and, at step 56, send a validation response to the user device. At step 57, the digital wallet 112 may create the passkey pair, sign the challenge extracted from the QR code, and, at step 58, return the signed challenge to the relying party 120. At step 59, the relying party may register the passkey pair and provide the client 114 with the authentication token 125.

Thus, the challenge request of step 46 is instead performed as part of step 53 with the provision of the QR code. This has several advantages including enhanced security, improved efficiency, simplified user experience, and facilitating offline enrollment. Security is enhanced by eliminating a separate round trip to fetch the challenge, which reduces the window of opportunity for potential interception or manipulation of the challenge. It also mitigates the risk of replay attacks because the challenge is uniquely tied to the QR code and its specific context. Efficiency is improved by bundling the challenge in the QR code, which reduces the number of steps and interactions required for enrollment. This also reduces latency, leading to a more responsive user experience. The user experience is simplified because the user can initiate enrollment by scanning the QR code, making enrollment smoother and more intuitive. It also reduces the potential for errors or confusion by minimizing the number of user interactions and decisions. In some cases, the user may be able to enroll the passkey offline because the QR code contains the necessary information, including the challenge, to complete the process without connectivity.

Figure 6:
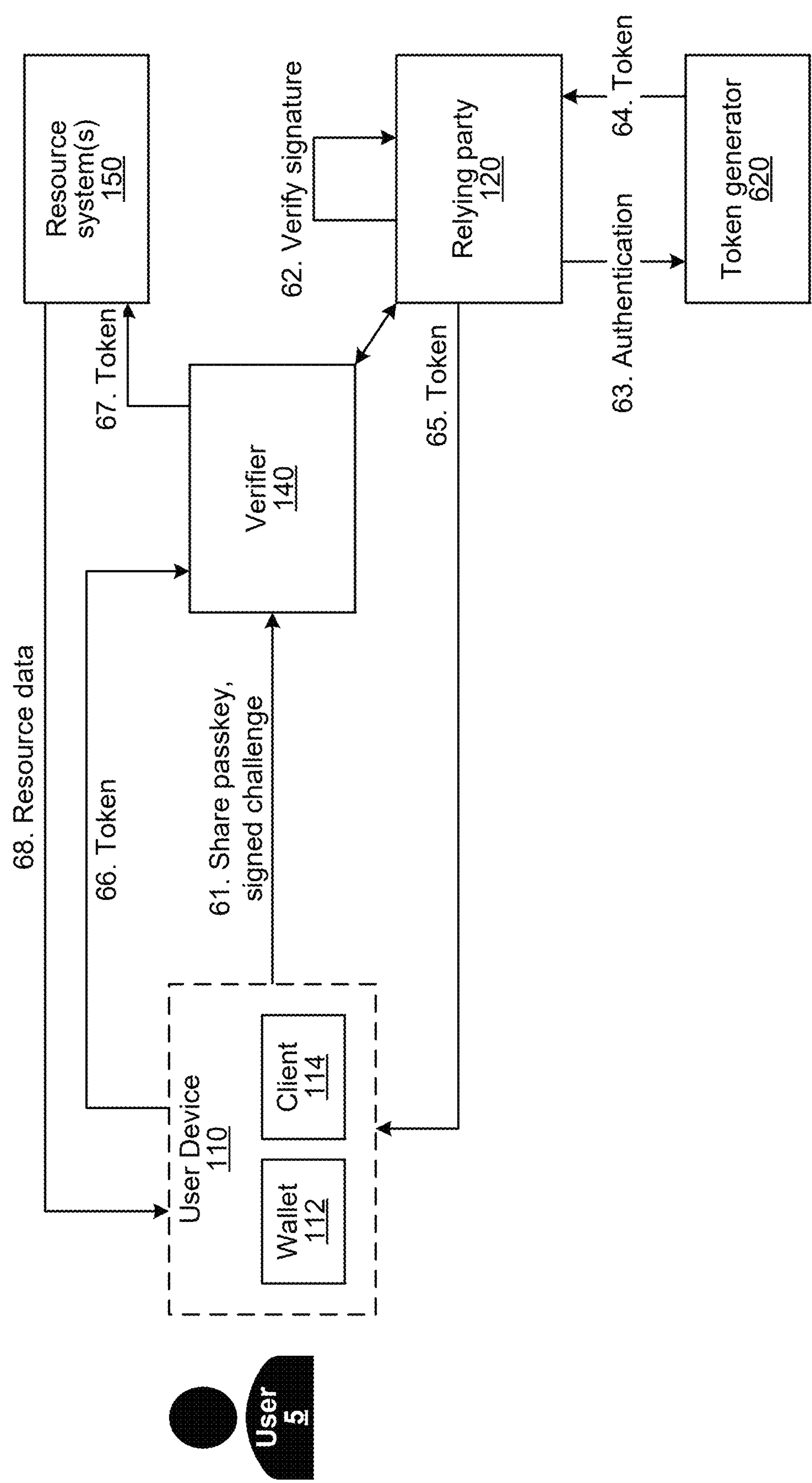
FIG. 6 is a conceptual diagram illustrating example operations for authenticating a passkey following enrollment, according to embodiments of the present disclosure.

FIG. 6 is a conceptual diagram illustrating example operations for authenticating a passkey following enrollment, according to embodiments of the present disclosure. At step 61, the digital wallet 112 may return the signed challenge and the public key of the passkey pair. This may coincide with steps 48 and 58 described above with respect to FIGS. 4 and 5, respectively. The relying party 120 may, at step 62, verify the signature of the signed challenge. Upon verifying the signature, the relying party 120 may, at step 63, send the authentication to a token generator 620, which may include software and/or hardware configured to generate the authentication token 125 based on the information provided by the relying party 120 (e.g., the identity of the user 5, permissions granted to the user 5, etc.). At step 64, the token generator 620 may return the authentication token 125. At step 65, the relying party 120 may send the authentication token 125 to the user device 110 for use by the client 114 when accessing the resource system(s) 150. When the user 5 wishes to access the resource system(s) 150, the client 114 may, at step 66, provide the authentication token 125 to the verifier 140, which may act as a front end/access gateway to the resource system(s) 150. The resource system(s) 150 may be associated with the relying party 120 and, in some cases, may be a part of the relying party 120. The verifier 140 may verify the authentication token 125 to determine, for example, that it is still valid (e.g., it has not expired or been revoked). If the token is valid, the verifier 140 may, at step 67, forward the authentication token 125 and/or the resource request to the relying party 120 and/or the resource system(s) 150. In some cases, the resource system(s) 150 may independently verify the authentication token 125. At step 68, the resource system(s) 150 may return the requested data to the client 114.

FIG. 7 is a block diagram illustrating an example user device 110 and system component 120, 130, and/or 140 communicating over a computer network 199, according to embodiments of the present disclosure. In some implementations, the user device 110 may be a user device 110 as a shown in FIG. 7. In some implementations, the user device 110 may be a system component 120, 130, and/or 140 as shown in FIG. 7 and/or a virtual machine executing on one or more system components 120, 130, and/or 140. One or more system components 120, 130, and/or 140 may make up one or more of the components described in the preceding figures. For example, the relying party(s) 120, the issuer 130, and/or the verifier 140 may be made up of (and/or execute on) one or more system components 120, 130, and/or 140.

While the user device 110 may operate locally to a user 5 (e.g., within a same environment so the device may receive inputs and playback outputs for the requestor) the system component(s) 120, 130, and/or 140 may be located remotely from the user device 110 as its operations may not require proximity to the requestor. The system component(s) may be located in an entirely different location from the user device 110 (for example, as part of a cloud computing system or the like) or may be located in a same environment as the user device 110 but physically separated therefrom (for example a home server or similar device that resides in a requestors home or office but perhaps in a closet, basement, attic, or the like). In some implementations, the system component(s) 120, 130, and/or 140 may also be a version of a user device 110 that includes different (e.g., more) processing capabilities than other user device(s) 110 in a home/office. One benefit to the system component(s) 120, 130, and/or 140 being in a requestor's home/office is that data used to process a command/return a response may be kept within the requestor's home/office, thus reducing potential privacy concerns.

The user device 110 may include one or more controllers/processors 704, which may each include a central processing unit (CPU) for processing data and computer-readable instructions, and a memory 706 for storing data and instructions of the respective device. The memories 706 may individually include volatile random-access memory (RAM), non-volatile read only memory (ROM), non-volatile magnetoresistive memory (MRAM), and/or other types of memory. User device 110 may also include a data storage component 708 for storing data and controller/processor-executable instructions. Each data storage component 708 may individually include one or more non-volatile storage types such as magnetic storage, optical storage, solid-state storage, etc. User device 110 may also be connected to removable or external non-volatile memory and/or storage (such as a removable memory card, memory key drive, networked storage, etc.) through respective input/output device interfaces 702.

Computer instructions for operating user device 110 and its various components may be executed by the respective device's controller(s)/processor(s) 704, using the memory 706 as temporary "working" storage at runtime. A device's computer instructions may be stored in a non-transitory manner in non-volatile memory 706, data storage component 708, or an external device(s). Alternatively, some or all of the executable instructions may be embedded in hardware or firmware on the respective device in addition to or instead of software.

User device 110 includes input/output device interfaces 702. A variety of components may be connected through the input/output device interfaces 702, as will be discussed further below. Additionally, user device 110 may include an address/data bus 710 for conveying data among components of the respective device. Each component within a user device 110 may also be directly connected to other components in addition to (or instead of) being connected to other components across the bus 710.

The user device 110 may include input/output device interfaces 702 that connect to a variety of components such as an audio output component such as a speaker 712, a wired headset or a wireless headset (not illustrated), or other component capable of outputting audio. The user device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 716 for displaying content. The user device 110 may further include a camera 718.

Via antenna(s) 722, the input/output device interfaces 702 may connect to one or more computer networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, etc. A wired connection such as Ethernet may also be supported. Through the network(s) 199, the system may be distributed across a networked environment. The I/O device interface 702 may also include communication components that allow data to be exchanged between devices such as different physical servers in a collection of servers or other components.

The system component 120, 130, and/or 140 may include one or more physical devices and/or one or more virtual devices, such as virtual systems that run in a cloud server or similar environment. The system component 120, 130, and/or 140 may include one or more input/output device interfaces 802 and controllers/processors 804. The system component 120, 130, and/or 140 may further include a memory 806 and storage 808. A bus 810 may allow the input/output device interfaces 802, controllers/processors 804, memory 806, and storage 808 to communicate with each other; the components may instead or in addition be directly connected to each other or be connected via a different bus.

A variety of components may be connected through the input/output device interfaces 802. For example, the input/output device interfaces 802 may be used to connect to the computer network 199. Further components include keyboards, mice, displays, touchscreens, microphones, speakers, and any other type of user input/output device. The components may further include USB drives, removable hard drives, or any other type of removable storage.

The controllers/processors 804 may process data and computer-readable instructions and may include a general-purpose central-processing unit, a specific-purpose processor such as a graphics processor, a digital-signal processor, an application-specific integrated circuit, a microcontroller, or any other type of controller or processor. The memory 806 may include volatile random-access memory (RAM), non-volatile read only memory (ROM), non-volatile magnetoresistive (MRAM), and/or other types of memory. The memory 806 may be used for storing data and controller/processor-executable instructions on one or more non-volatile storage types, such as magnetic storage, optical storage, solid-state storage, etc.

Computer instructions for operating the system component 120, 130, and/or 140 and its various components may be executed by the controller(s)/processor(s) 804 using the memory 806 as temporary "working" storage at runtime. The computer instructions may be stored in a non-transitory manner in the memory 806, storage 808, and/or an external device(s). Alternatively, some or all of the executable instructions may be embedded in hardware or firmware on the respective device in addition to or instead of software.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method (e.g., a computer-implemented method) or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving a first request for access to a resource system, the first request generated by a user device;

encoding, into image data, a specification for generating verifiable presentations;

sending the image data to the user device;

receiving, from the user device in response to the image data, a verifiable presentation corresponding to the specification;

verifying that the verifiable presentation demonstrates possession of a verifiable credential corresponding to access to the resource system;

in response to verifying the verifiable presentation, sending, to the user device, first data representing a cryptographic challenge and information for generating a passkey;

receiving, from the user device in response to the first data, second data including a digitally signed response to the cryptographic challenge and a first public key corresponding to a first passkey pair generated by the user device based on the first data;

determining that the digitally signed response was signed using a first private key corresponding to the first public key; and in response to determining that the digitally signed response was signed using a first private key corresponding to the first public key, registering the first public key as corresponding to access to the resource system.

2. The computer-implemented method of claim 1, further comprising:

in response to registering the first public key, generating an authentication token corresponding to the first public key; and sending the authentication token to the user device.

3. The computer-implemented method of claim 2, further comprising:

receiving, from the user device, a second request to access the resource system, the second request including the authentication token;

verifying the authentication token;

in response to verifying the authentication token, generating third data representing a response to the second request; and sending the third data to the user device.

4. The computer-implemented method of claim 1, further comprising:

receiving a second request to access the resource system;

determining that the second request does not correspond to a valid passkey;

sending second image data to the user device, the second image data representing the specification for generating verifiable presentations;

receiving a second verifiable presentation generated based on the second image data; and in response to verifying that the second verifiable presentation demonstrates possession of the verifiable credential, registering a second public key corresponding to a second passkey pair generated by the user device.

5. The computer-implemented method of claim 1, wherein the verifiable presentation corresponds to a proof that the verifiable credential was issued to the user device by a trusted issuer.

6. A system, comprising:

one or more processors; and at least one memory comprising instructions that, when executed by the one or more processors, cause the system to:

receive a first request for access to a resource system, the first request generated by a user device;

encode, into image data, a specification for generating verifiable presentations;

send the image data to the user device;

receive, from the user device in response to the image data, a verifiable presentation corresponding to the specification;

verify that the verifiable presentation demonstrates possession of a verifiable credential corresponding to access to the resource system;

in response to verifying the verifiable presentation, send, to the user device, first data representing a cryptographic challenge and information for generating a passkey;

receive, from the user device in response to the first data, second data including a digitally signed response to the cryptographic challenge and a first public key corresponding to a first passkey pair generated by the user device based on the first data;

determine that the digitally signed response was signed using a first private key corresponding to the first public key; and in response to determining that the digitally signed response was signed using a first private key corresponding to the first public key, register the first public key as corresponding to access to the resource system.

7. The system of claim 6, wherein the at least one memory further comprises instructions that, when executed by the one or more processors, further cause the system to:

in response to registering the first public key, generate an authentication token corresponding to the first public key; and send the authentication token to the user device.

8. The system of claim 7, wherein the at least one memory further comprises instructions that, when executed by the one or more processors, further cause the system to:

receive, from the user device, a second request to access the resource system, the second request including the authentication token;

verify the authentication token;

in response to verifying the authentication token, generate third data representing a response to the second request; and send the third data to the user device.

9. The system of claim 6, wherein the at least one memory further comprises instructions that, when executed by the one or more processors, further cause the system to:

receive a second request to access the resource system;

determine that the second request does not correspond to a valid passkey;

send second image data to the user device, the second image data representing the specification for generating verifiable presentations;

receive a second verifiable presentation generated based on the second image data; and in response to verifying that the second verifiable presentation demonstrates possession of the verifiable credential, register a second public key corresponding to a second passkey pair generated by the user device.

10. The system of claim 6, wherein the verifiable presentation corresponds to a proof that the verifiable credential was issued to the user device by a trusted issuer.

11. A computer-implemented method comprising:

sending, from a user device to one or more system components separate from the user device, a first request for access to a resource system;

receiving, in response to the first request, first image data encoding a specification for generating verifiable presentations;

scanning, using a digital wallet application of the user device, an image corresponding to the first image data;

presenting a first prompt for approval to generate a first verifiable presentation;

in response to receiving approval to generate the first verifiable presentation, generating first data representing the first verifiable presentation, the first data corresponding to the specification;

sending the first data to the one or more system components;

receiving, in response to the one or more system components verifying the first data, second data representing (i) information for generating a passkey, and (ii) a cryptographic challenge generated by a relying party corresponding to the resource system;

presenting a second prompt for approval to generate the passkey;

in response to receiving approval to generate the passkey, generating, using the digital wallet application, a first passkey pair including a first public key and a corresponding first private key;

generating, using the digital wallet application and the first private key, a digitally signed response to the cryptographic challenge; and sending, to the one or more system components, third data representing the first public key and the digitally signed response, the one or more system components registering the first public key as corresponding to access to the resource system.

12. The computer-implemented method of claim 11, further comprising:

prior to sending the first request, receiving a verifiable credential issued by a trusted issuer, wherein the first verifiable presentation corresponds to a proof of possession of the verifiable credential.

13. The computer-implemented method of claim 11, further comprising:

receiving, in response to sending the first public key, an authentication token corresponding to the first public key.

14. The computer-implemented method of claim 13, further comprising:

sending, to the one or more system components, a second request to access the resource system, the second request including the authentication token; and receiving, in response to the one or more system components verifying the authentication token, fourth data responsive to the second request.

15. The computer-implemented method of claim 11, further comprising:

sending, to the one or more system components, a second request to access the resource system;

receiving second image data from the one or more system components, the second image data sent in response to a determination that the second request does not correspond to a valid passkey;

sending, to the one or more system components, fourth data representing a second verifiable presentation generated based on the second image data;

generating a second passkey pair including a second public key and a corresponding second private key; and sending the second public key to the one or more system components, the one or more system components registering the second public key as corresponding to access to the resource system.

* * * * *